US005604688A

United States Patent [19]
Chu et al.

[11] Patent Number: 5,604,688
[45] Date of Patent: Feb. 18, 1997

[54] MESSAGE DISPLAY CALCULATOR

[75] Inventors: William Chu, Taipei, Taiwan; Richard A. Waldinger, Searingtown, N.Y.

[73] Assignee: Tomax Enterprises, Inc., Irwindale, Calif.

[21] Appl. No.: 376,233

[22] Filed: Jan. 23, 1995

Related U.S. Application Data

[63] Continuation of Ser. No. 95,148, Jul. 20, 1993, abandoned, which is a continuation-in-part of Ser. No. 3,722, Jan. 13, 1993, abandoned.

[51] Int. Cl.$^6$ ........................................... G06F 3/00
[52] U.S. Cl. ............................................. 364/710.01
[58] Field of Search ........................ 364/710.01, 710.1, 364/705.06, 419.19, 708.1

[56] References Cited

U.S. PATENT DOCUMENTS

| | | | |
|---|---|---|---|
| 4,117,542 | 9/1978 | Klausner et al. | 364/705.06 |
| 4,164,038 | 8/1979 | Nachtigal | 364/705.06 |
| 4,386,412 | 5/1983 | Ito | 364/709.06 |
| 4,514,920 | 5/1985 | Shafrir et al. | 40/448 |
| 4,719,338 | 1/1988 | Avery et al. | 364/705.06 |
| 5,034,858 | 7/1991 | Kawamoto et al. | 364/708.1 |

*Primary Examiner*—Tan V. Mai
*Attorney, Agent, or Firm*—Christie, Parker & Hale, LLP

[57] ABSTRACT

A pocket calculator includes a casing having on its front face numeric and function keys and a numeric first liquid crystal display (LCD) and a message second LCD. Housed in the casing is a calculator network module housing and a first battery connected through a key operated switch contained in the network to energize the network and actuate the first LCD. An inverter IC integrated circuit and second battery are housed in the casing and actuate the second LCD, the battery being connected to the inverter input through a transistor switch rendered conductive in response to the energization of the calculator network. Alternatively, a message third LCD provided in which the message is devisualized upon the application of a voltage thereto with the energization of the computer. The second and third LCDs may be a single common unit with the faces of a section of a common LCD being coated with light polarizing layers which are optically mutually perpendicular.

9 Claims, 3 Drawing Sheets

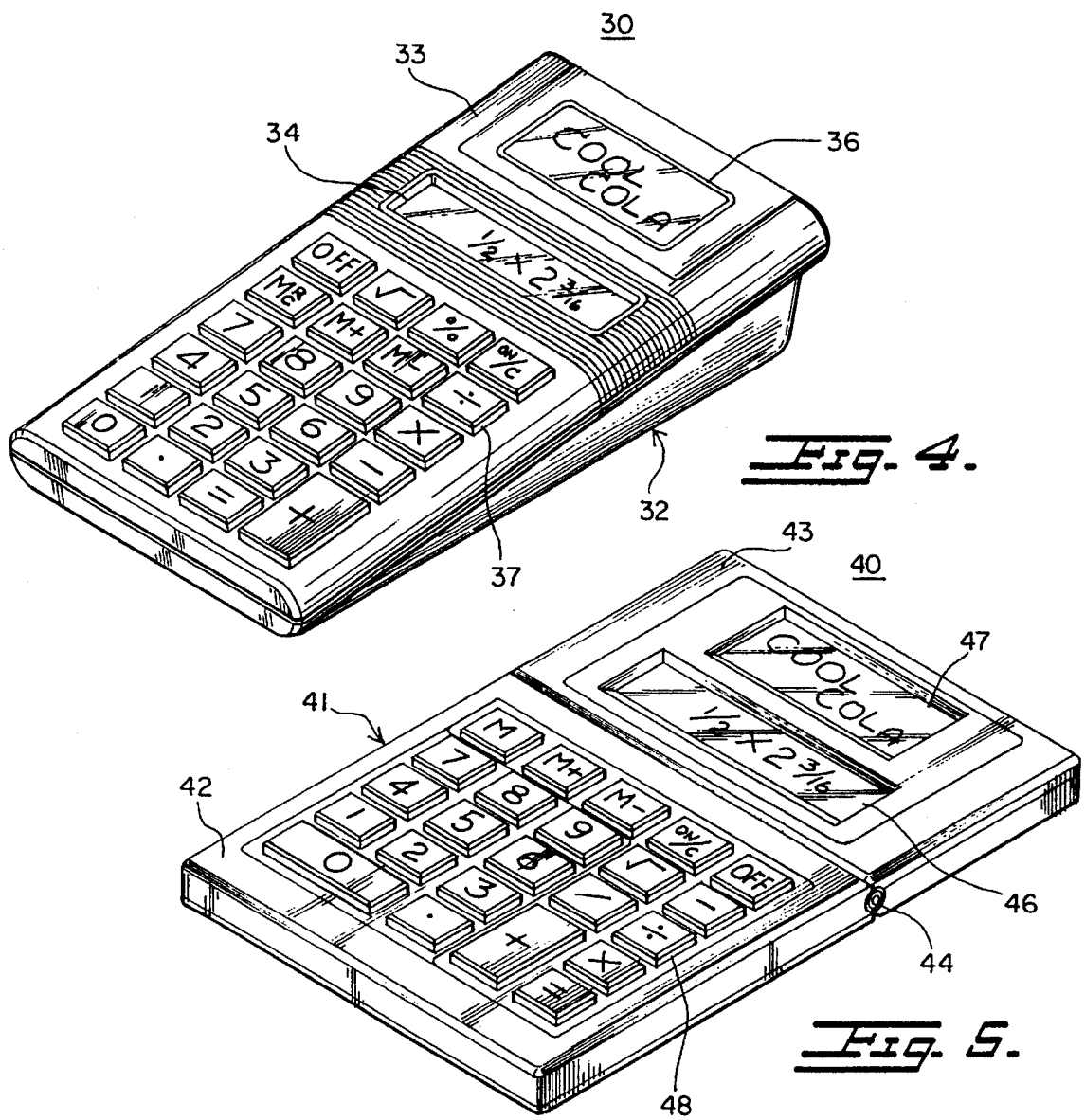
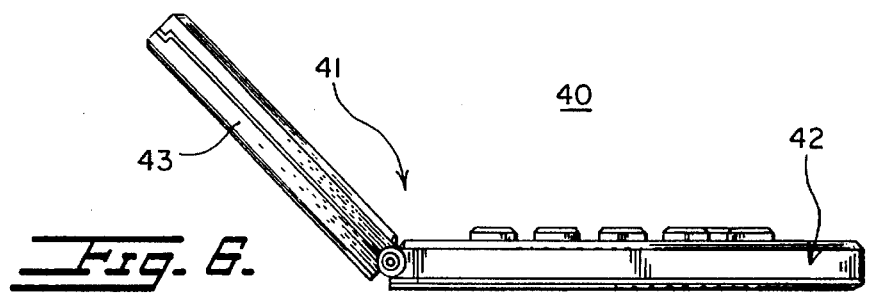

MESSAGE DISPLAY CALCULATOR

REFERENCE TO RELATED PATENT APPLICATION

The present application is a continuation of U.S. patent application Ser. No. 08/095,148 filed on Jul. 20, 1993, now abandoned, which in turn is a continuation-in-part of U.S. patent application Ser. No. 08/003,722 filed Jan. 13, 1993, now abandoned.

BACKGROUND OF THE INVENTION

The present invention relates generally to improvements in calculators and it relates particularly to an improved compact calculator providing an electrically actuated message display device in addition to the calculator numeric display.

Many different media are employed for providing information of an advertising nature including particularly advertising logos and copy. However, those media which are generally available possess numerous drawbacks and disadvantages. They are usually of a disposable and transitory nature and usually costly per viewer and period viewed. Moreover, the presentation is static and often overlooked and otherwise leaves much to be desired.

SUMMARY OF THE INVENTION

It is a principal object of the present invention to provide an improved calculator device.

Another object of the present invention is to provide an improved calculator device which dynamically presents a message in addition to the results of a calculation operation.

A further object of the present invention is to provide an improved calculator device which, in addition to displaying the results of a calculation inputted to the calculator, exhibits an advertising logo or other message concurrently with the actuation of the calculator.

Still a further object of the present invention is to provide an improved device of the above nature characterized by its simplicity, ruggedness, compactness, high efficiency, low cost, reliability and great versatility and adaptability.

The above and other objects of the present invention will become apparent from a reading of the following description taken in conjunction with the accompanying drawings which illustrate preferred embodiments thereof.

A device in accordance with the present invention comprises a compact calculator including numeric and function keys and a multiple segment numeric first LCD on its front face, a computer network with an output actuating the LCD and controlled by the keys and a voltage source energizing the calculator network and a second LCD with message delineating electrode actuated with the energization of the calculator network.

In the preferred form of the improved device, the second LCD which includes a message delineating unit electrode or electrically interconnected electrode segments is connected to the output of an inverter whose input is connected through a transistor switch to a battery, the base of the transistor being connected to the calculator switch through the calculator actuating switch. The casing is advantageously of pocket or hand-held calculator size.

The improved calculator device is simple and inexpensive and is highly effective, efficient, and reliable in delivering a message in addition to the calculator information in an attractive manner.

BRIEF DESCRIPTION OF THE DRAWINGS

FIG. 4 is a front perspective view of another embodiment of the present invention;

FIG. 5 is a front end perspective view of another embodiment of the present invention shown in a lay flat condition;

FIG. 6 is a side view thereof shown in a partially folded condition;

DESCRIPTION OF THE PREFERRED EMBODIMENTS

Figure 1:
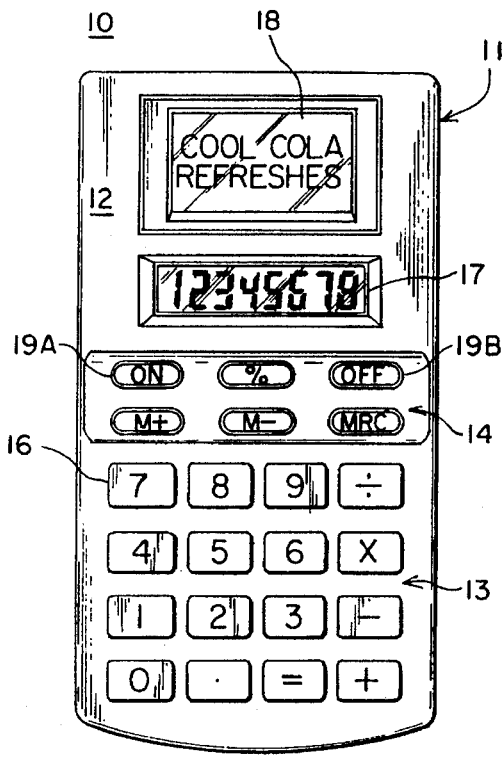
FIG. 1 is a top plan view of a calculator device embodying the present invention.
Figure 2:
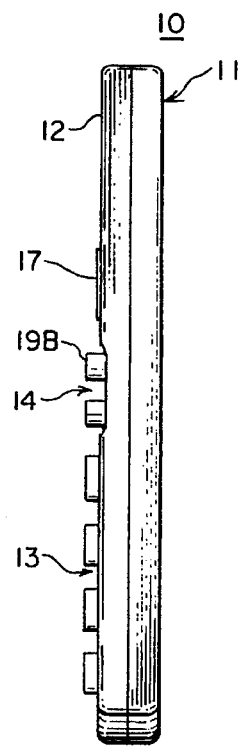
FIG. 2 is a side elevational view thereof.
Figure 3:
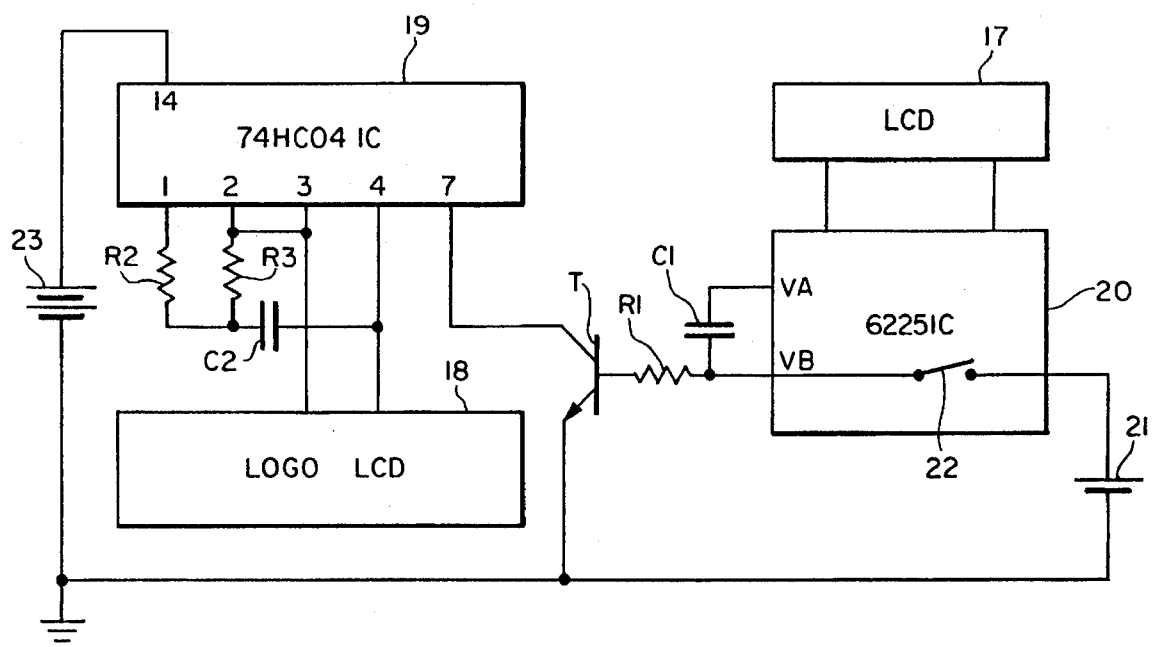
FIG. 3 is a block schematic diagram of the electrical network of the device.

Referring now to the drawings, particularly FIGS. 1 to 3 thereof which illustrate a preferred embodiment of the present invention, the reference numeral 10 generally designates the improved calculator and message display device which includes a thin casing 11 of rectangular configuration. Casing 11 includes a top or front wall face 12 on which are located longitudinally spaced groups 13 and 14 of finger operated input keys 16 which include numeric keys and function keys, a rectangular numeric first (liquid crystal display) LCD 17 and a rectangular message display second LCD 18. The keys 16 include calculator energizing on key 19A and off key 19B. The second LCD 18 includes either a unitary electrode or an electrode defining plurality of electrically interconnected electrode elements which delineate a message such as an advertising logo which may include a symbol and information.

Housed in casing 11 are the electrical and energizing components of the calculator and message actuating sections of device 10. The calculator section includes a conventional calculator integrated circuit network or module 20, for example, a 62251C integrated circuit having a multi-terminal output whose terminals are connected to corresponding input terminals of first LCD 17. The input control terminals of IC network 20 are connected to respective input signal switches actuated by respective input keys 16 in the known manner. Also housed in casing 11 is a battery 21 whose positive terminal is connected to IC network 20 through a circuit energizing switch 22 within the network and actuated by way of on and off keys 19A and 19B to alternatively energize and de-energizing IC circuit 20. The negative terminal of battery 21 is grounded.

The terminal VB of IC network 20 is at a positive potential with the closing of switch 22 and the energization of IC network 20 and is connected through a resistor R1 to the base of NPN switching transistor T whose emitter is grounded. A battery 23 housed in casing 11 has its positive terminal connected to a casing housed inverter IC 19 at the positive power input terminal (14) thereof, the inverter power input negative terminal (7) being connected to the collector of transistor T. The negative terminal of battery 22 is grounded. The VA and VB terminals of IC network 20 are coupled by a capacitor C1.

Inverter network 19 may, for example, be a 74HC04 IC integrated circuit with its terminal (1) connected to terminal (2) through series connected resistors R2 and R3 whose junction is connected through a capacitor C2 to inverter terminal (4) and to one terminal of LCD 18. The other terminal of LCD 18 is connected to inverter interconnected terminals (2) and (3). The alternating current frequency of the output of inverter 19 is determined by the values of resistors R2 and R3 and capacitor C2 and the AC current is applied to LCD 18.

In the application of the device 10 the calculator operates in the conventional manner and the calculator network 20 is energized and actuated with the depression of on key 19A. With the energization of calculator network 20, terminal VB becomes positive rendering normally non-conducting transistor T conducting. With the conduction condition of transistor T a DC voltage from battery 23 is applied to the input of inverter 19 to produce an AC output which actuates LCD 18 which in mm renders visible a message delineated by the configuration of the electrode or electrode array of LCD 18. The message is preferably an advertising logo which may include one or more symbols and copy.

In FIG. 4 of the drawings, there is shown a message display calculator 30 differing from that described above only in the shape of the casing 32. Specifically, casing 32 includes a front face or top wall 33 which is flat and upwardly rearwardly inclined relative to the bottom wall to delineate a wedge shaped casing. Located in the rear or upper section of inclined top wall 33 is a rectangular lower numeric LCD 34 and located in the upper section end portion is a rectangular message display LCD 36, LCDs 34 and 36 corresponding to earlier described LCDs 17 and 18 respectively. Finger operated switch actuating numeric and function keys 37 are arranged on the lower section of top wall 33.

Housed in casing 32 are a computer IC, an inverter IC, a pair of batteries, a switching transistor and resistors and capacitors similar to the corresponding components described in the earlier embodiment and related among themselves and the calculator and message display LCDs like in such earlier embodiment. The operation of the device 30 is similar to that first described.

Referring to FIGS. 5 and 6 of the drawings, there is illustrated a message display calculator device 40 which differs from the device 10 first described primarily in that the casing 41 is divided into two rectangular sections, a forward section 42 and a rear section 43, each section having a flat face top wall. Casing sections 42 and 43 are mutually relatively swingable about a transverse axis, being joined by a transverse hinge 44.

A rectangular numeric LCD 46 and a rectangular message display LCD 47 are longitudinally spaced and extend transversely on the top wall front face of casing rear section 43. The calculator operating keys 48 are arranged on the top wall front face of the casing forward section 42. The electrical networks, components and batteries are similar to those first described and are similarly related to each other and to the calculator and message LCDs. The electrical components and batteries may be housed in casing front section 42 or they may be distributed, as convenient, between the relatively articulated casing sections. The operation of the embodiments described above are similar to each other.

Figures 7, 9:
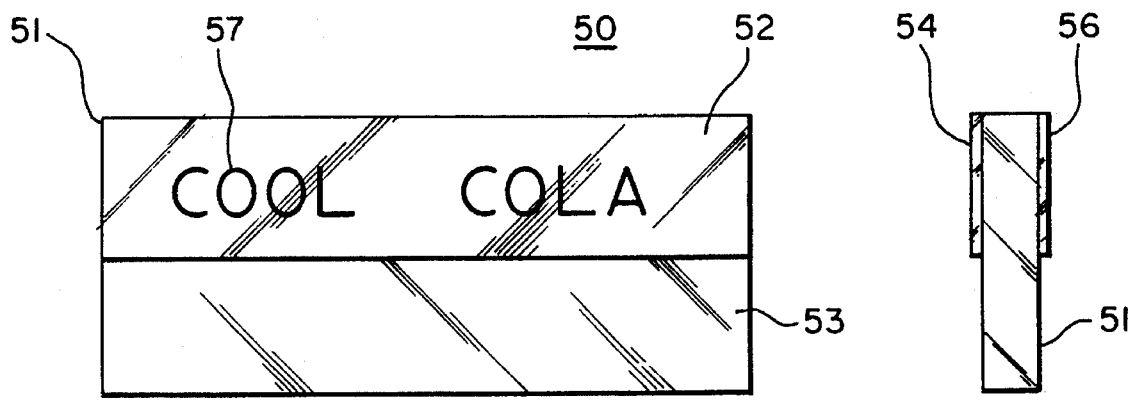
FIG. 7 is a top plan view of a modified logo display in accordance with another embodiment of the present invention shown in a nonenergized mode.
FIG. 9 is an end elevational view thereof.
Figure 8:
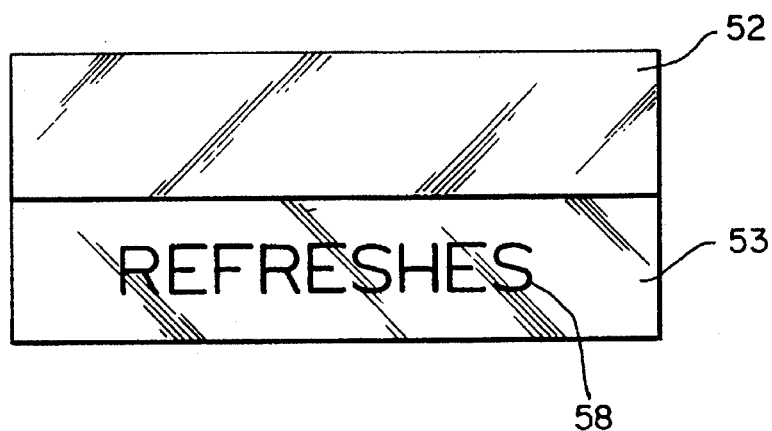
FIG. 8 is a similar view thereof but shown in an energized mode.

Referring now to FIGS. 7 to 9 of the drawings which illustrate a message display member 50 which may be substituted for the LCD display 18 earlier described in any of the other embodiments. The display member 50 includes a rectangular LCD 51 divided into upper and lower display sections 52 and 53 respectively. The opposite faces of upper display section 52 are covered by light polarizing films 53 and 56 whose optical polarizing axes are at 90° to each other.

The lower display section 53 similar in construction and operation to LCD display 18 whereas the upper display section 52 corresponds to a TN-LCD, a message 57 being located on the underface of bottom film 54. A message 58 is provided in the LCD lower section 53 as in the case of LCD display 18. The LCD 51 is connected to the energizing and actuating network shown in FIG. 3 for LCD 18 so as to actuate LCD 51 with the activation or energization of an associated calculator.

In the operation of the last described embodiment of the invention in the unenergized condition of the calculator with switch 22 open, LCD 51 is unenergized so that message 58 is not actuated. On the other hand, message 57 is visible through the polarized film sandwiched upper section of LCD 51 by reason of the LCD 51 rotating the polarized light passing through the LCD at 90° thereby making the polarizing film covered upper section is transparent to the transmitted light and providing visual access to message 57. However, upon energization of the calculator by closing switch 22, message 58 is visualized as earlier explained but message 57 is masked by the LCD upper section since orientation of the crystals in the LCD by reason of the applied voltage maintains the orientation of the polarized light traversing film 56 so as to render the film covered upper section of LCD 51 substantially opaque. It should be noted that while the upper and lower sections of LCD 51 are shown as a single unit they may be separate units and located as desired.

While there have been described and illustrated preferred embodiments of the present invention, it is apparent that numerous alterations, omissions and additions may be made without departing from the spirit thereof.

We claim:

1. A multiple display calculator device comprising:
   a calculator including a casing having a front face, a plurality of numeric and function keys located on said front face, a numeric first LCD located on said front face, a calculator network responsive to the actuation of said keys and having an output actuating said first LCD, and voltage means for energizing said calculator network;
   a second LCD located on said front face for selectively passing light therethrough; and
   a predetermined message positioned behind the second LCD such that the message is visible when light is selectively passed through the second LCD.

2. The device of claim 1 wherein said front face is rectangular and said key group and LCDs are longitudinally spaced.

3. The device of claim 1 wherein said casing is articulated to form first and second longitudinally spaced sections, said keys being located on said first section and said first and second LCDs being located on said second section.

4. The device of claim 1 wherein said second LCD actuating means includes an inverter network having an output electrically connected to said second LCD.

5. The device of claim 4 wherein said second LCD actuating means further includes a battery and a switch responsive to the energization of said calculator network connected between said battery and said inverter network.

6. The device of claim 5 wherein said switch includes a switching transistor responsive to the energization of said calculator network.

7. The device of claim 1 wherein said calculator network energizing means includes a battery and said calculator network includes a switch connecting said network to said battery and responsive to the actuation of one of said function keys.

8. The device of claim 1 wherein said second LCD is orientated to pass light to visualize the predetermined message in the absence of a voltage applied to the second LCD, and orientated to prevent light from passing such that the predetermined message is devisualized when a voltage is applied to said second LCD.

9. The device of claim 1 wherein said second LCD is orientated to pass light to visualize the predetermined message when said calculator network is de-energized, and orientated to prevent light from passing such that the predetermined message is devisualized when said calculator network is energized.

* * * * *

UNITED STATES PATENT AND TRADEMARK OFFICE
CERTIFICATE OF CORRECTION

PATENT NO. : 5,604,688
DATED : February 18, 1997
INVENTOR(S) : William Chu; Richard A. Waldinger It is certified that error appears in the above-indentified patent and that said Letters Patent is hereby corrected as shown below:

Column 3, line 22, replace "in mm" with -- in turn --.

Signed and Sealed this

Twenty-first Day of October 1997

Attest:

BRUCE LEHMAN

Attesting Officer

Commissioner of Patents and Trademarks